Feb. 12, 1935.    G. JOHNSTON    1,990,491
INSTRUMENT MOUNT
Original Filed Nov. 21, 1930    4 Sheets-Sheet 3

Inventor
GREENHOW JOHNSTON
By
Attorney

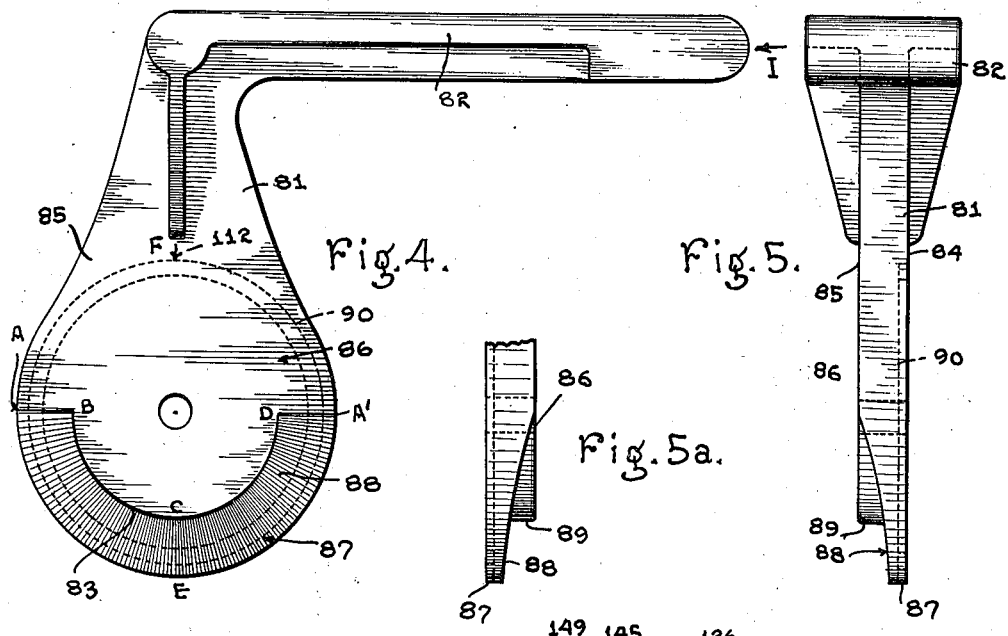
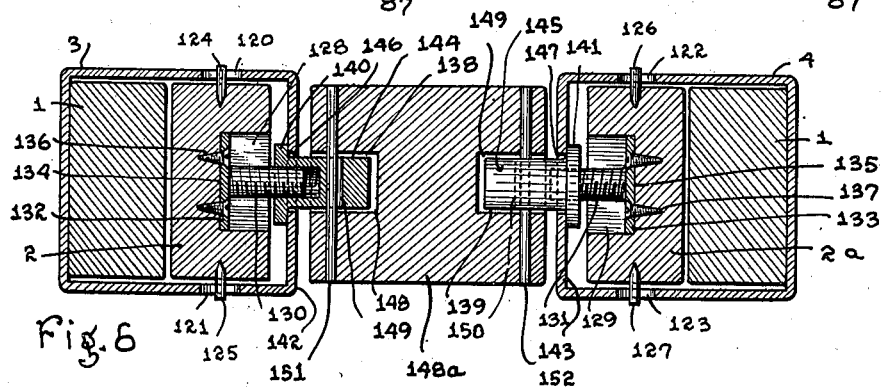
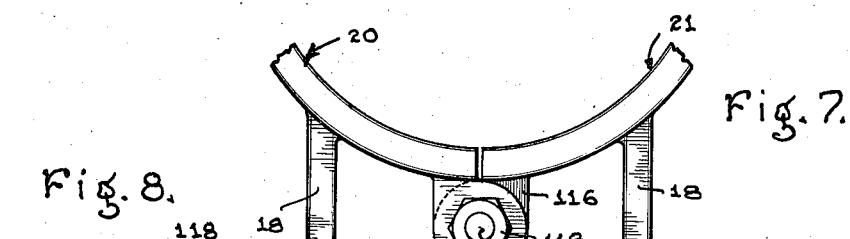
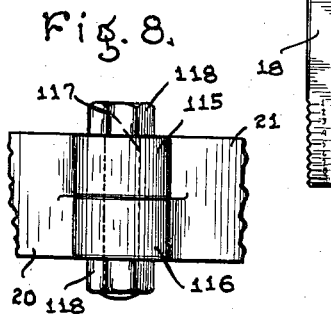

UNITED STATES PATENT OFFICE 1,990,491

INSTRUMENT MOUNT

Greenhow Johnston, Glen Allen, Va., assignor of one-half to Greenhow Maury, Jr., Richmond, Va.

Application November 21, 1930, Serial No. 497,289
Renewed December 7, 1932

24 Claims. (Cl. 248—47)

The present invention relates broadly to supports and more particularly to tripods having supporting legs, a base member and a mount or carrying-head thereon adapted to carry and direct an instrument and especially cameras, machine guns, and the like, it being desirable that such instruments in order to accurately accomplish their purpose function with a fast and smooth-acting movement.

Supports in tripods heretofore used for instruments of the character set forth have been of a heavy and cumbersome construction and slow in their movement. When used for moving picture work or to mount a gun, adapted to follow an aeroplane, it is of paramount importance that the instrument accurately and quickly follow the moving object. Therefore, vibration must be eliminated as far as possible or reduced to a minimum. The mountings hitherto used have relied upon a gear movement or a spring construction, or a combination of the same, to effect a vertical movement of the mount or instrument carrying-head. Such arrangement does not afford a sufficient and adequate control. Both the spring and gear operated tilting mounts or instrument carrying-heads have the defect that when motion is once started, it cannot be instantly stopped at a particular point without a great effort.

The present invention, while particularly directed to tripods and mountings therefor, is of universal application and therefore the invention in its broadest aspect is in general directed to supports.

Broadly stated, the present invention comprises the combination of a base, a carrying-head mounted thereon, variable pressure braking means carried by the latter, said variable pressure means being set under predetermined pressure to hold the instrument carrying head and the instrument in set initial position, and an instrument carrying-head pivotally mounted for rotative movement on the carrying-head and provided with a lower member shaped to tighten itself against the variable pressure means as the instrument carrying head and the instrument move from the initial set position. Stated differently, the invention broadly comprises the combination of a support, an instrument carrying head pivotally mounted on said support and having a normal position from which it may move on said support, and brake means engaging the head and resisting the movement of the head from normal position, said head and brake means being arranged so that the braking effect of the head is increased as the displacement of the head from normal position increases. The increase in braking effect is in direct ratio with the extent of angular displacement of the head from normal position. In the more specific aspect of the invention, the instrument carrying-head has an upper member and a lower cam-shaped member, preferably a cam wedge. Upper primary braking means are positioned adjacent the upper member of the instrument carrying-head and lower secondary variable pressure braking means are positioned adjacent the lower cam-shaped member to cooperate therewith to resist the torque induced by weight of an instrument mounted on the instrument carrying-head. The lower carrying-head is preferably mounted in the supporting base for universal movement, and an upper carrying-head is mounted thereon for horizontal rotative movement. The tripod supporting base preferably comprises arcuate members adapted to encase the lower carrying-head, a split supporting base being provided with abutting flanges. Means are provided for locking the lower carrying-head in a predetermined position in the arcuate members.

The lower carrying-head mounted in the supporting base for universal movement preferably has an upper wall provided with a recess having disposed therein a friction material. The bottom member of the upper carrying-head has a portion of its lower surface disposed against the friction material. Means are provided for locking the upper carrying-head in a predetermined position on the lower carrying-head. Means are also provided for eliminating vertical motion between the lower carrying-head and the upper carrying-head while permitting smooth, horizontal, rotative motion of the latter on the former.

In the more specific aspect of the invention the base member of the upper carrying-head has mounted thereon an instrument carrying-head supporting standard, the latter being apertured to receive an instrument carrying-head bearing. There is provided a second standard adapted to support the instrument carrying-head bearing and having positioned therein a rotatable externally threaded guide nut apertured along its longitudinal axis and adapted to receive a pin capable of being advanced by rotation of the guide nut. Upper primary braking means is mounted on the instrument carrying-head bearing adjacent the upper member of the instrument carrying-head, and lower secondary variable pressure braking means set under a predetermined initial pressure to hold the instrument carrying head and instrument in a set initial position, said secondary variable pressure braking means being mounted on the guide nut pin and adjacent the lower wedge-shaped member of the instrument carrying-head, the lower secondary variable pressure braking means, the wedge-shaped member tightening itself against the set lower secondary variable pressure braking means as the instrument carrying head and the instrument move from the initial set position, the more these members move the greater the tightening action since the braking effect of the secondary braking means increases as the displacement of the instrument carrying head from its normal position increases, the increase in braking effect being in direct ratio with the extent of angular displacement of the instrument carrying head from its normal position.

Preferably the inner wall of the instrument supporting standard is positioned against the inner wall of the instrument carrying-head, and one of these walls is recessed to receive a friction material. In the drawings, the friction material is shown in the inner wall of the instrument carrying-head. However, this may be reversed and the friction material may be carried by the inner wall of the instrument carrying-head supporting standard.

The tripod is provided with stationary and extensible legs set at a slight angle to one another and means are provided for tightening the legs together. A clamp encases a portion of each stationary leg and each extensible leg. The clamps are slotted and ride on a pin fixed in the extensible leg. Means are provided for simultaneously moving the inner legs outwardly and drawing the clamp inwardly to tighten and lock each extensible leg to its corresponding stationary leg. These means may comprise a tension block, oppositely threaded members fixed in recesses in opposing extensible legs, locking bolts flanged adjacent the inner ends of each clamp, the locking bolts being rotatively carried on each threaded member and projecting into grooves in the tension spacing block. The locking bolts are mounted to rotate with the tension spacing block, the latter when in any predetermined position having a slight horizontal and vertical play to compensate for the varying angularity of the tension spacing block. The locking device, while particularly used to lock the stationary and extensible members of a tripod, may be used to lock any two stationary and movable members mounted at a slight angle to one another. Broadly stated, in a locking device, the movable means are mounted on the movable members and around the stationary members, and means are provided for simultaneously moving the movable members in one direction and the movable means in a reverse direction to tighten and lock the stationary and movable members together.

While the objects of the present invention will appear from the above, it may be stated that the primary object of the present invention is to provide a tripod and mounting therefor in which the disadvantages pointed out are substantially eliminated or reduced to a minimum.

The present invention also contemplates certain novel details of combination, construction and arrangement of parts of the improved apparatus whereby certain important advantages are obtained, as will be more fully described hereinafter and pointed out in the claims, it being understood that the invention is susceptible of various changes in construction which may be made within the scope of the claims without departing from the spirit of the invention.

The present invention will be disclosed and fully explained by reference to the accompanying drawings.

Figure 4 is a side elevation of the instrument carrying-head;

Figure 5 is a front elevation of the instrument carrying-head;

Figure 5a is a rear elevation of the instrument carrying-head;

Figure 6 is a horizontal sectional view taken on line 6—6 of Figure 3, showing the means for tightening and locking each extensible leg to its corresponding stationary leg; and Figures 7 and 8 are fragmentary views showing a modified construction of the split tripod supporting base.

Figure 1:
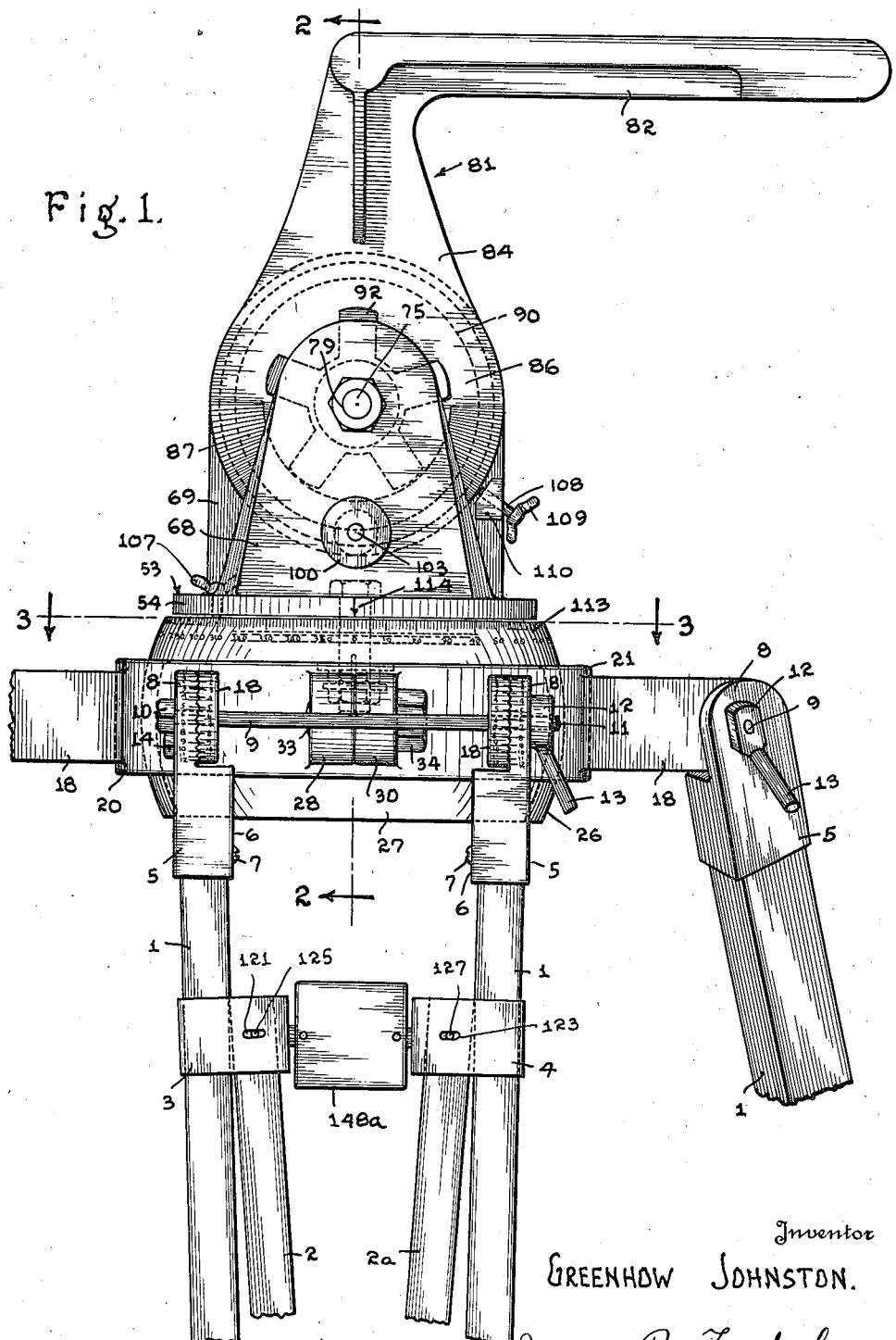
Figure 1 is a side elevation of the tripod and mounting therefor.
Figure 2:
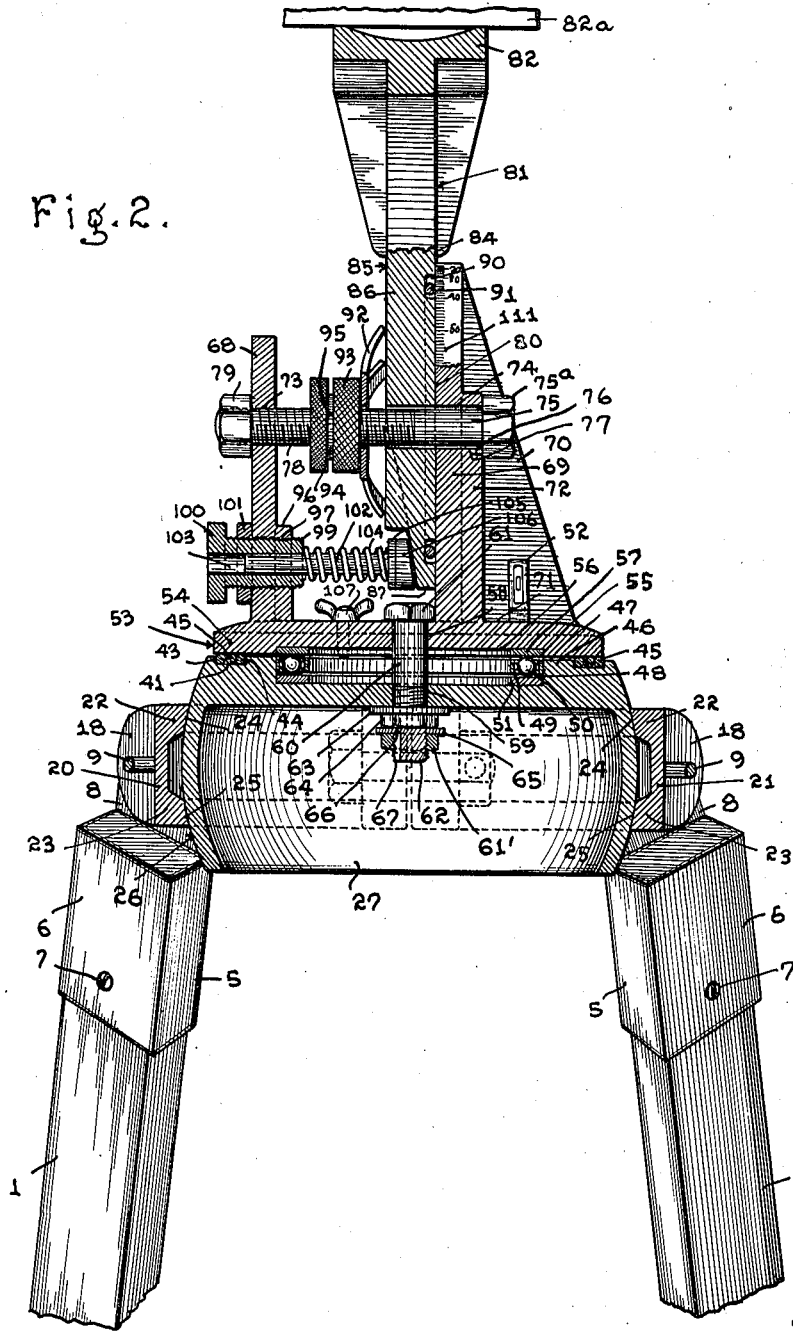
Figure 2 is a vertical cross section taken on the line 2—2 of Figure 1.
Figure 3:
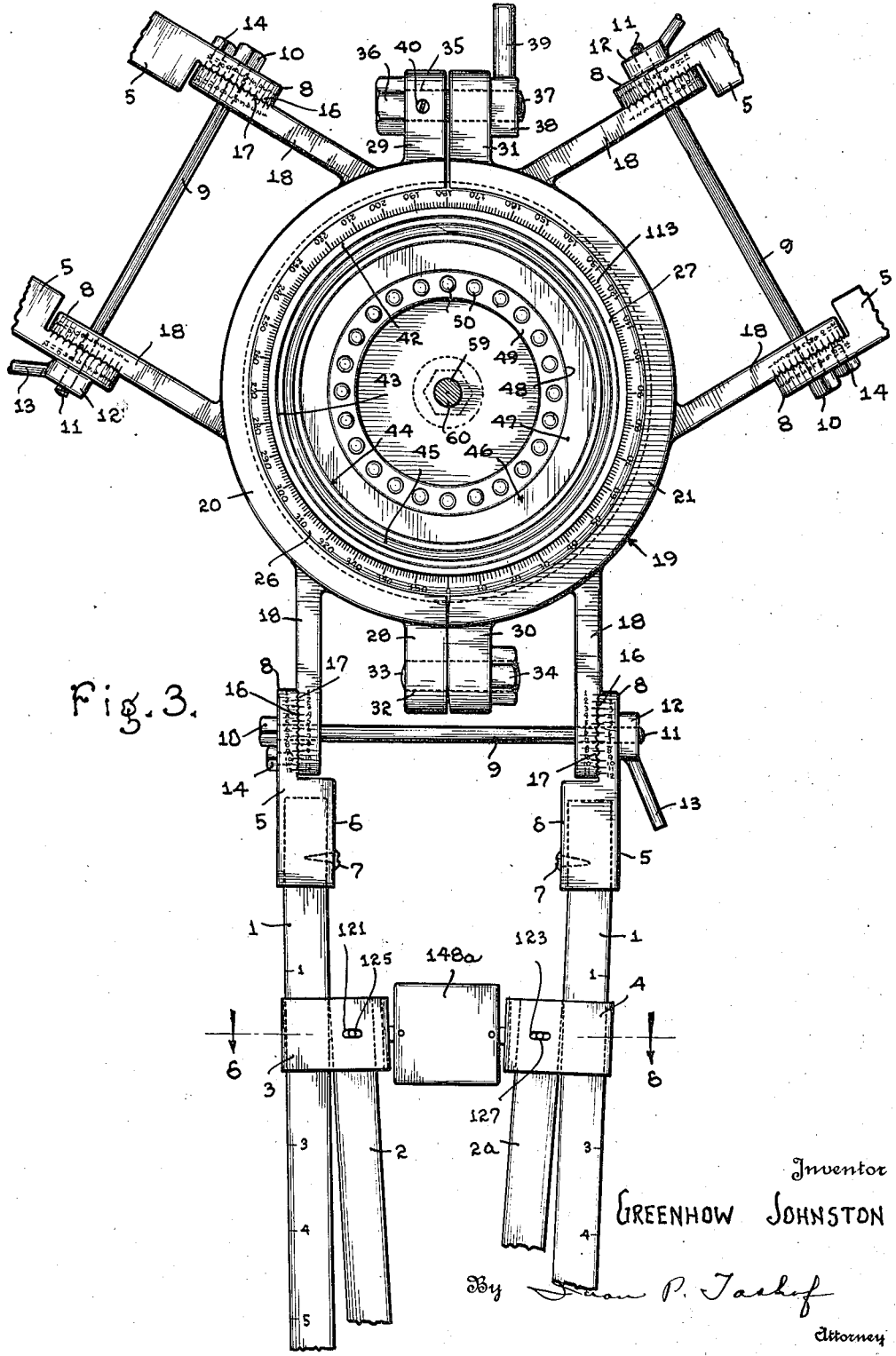
Figure 3 is a plan view taken on line 3—3 of Figure 1.

The tripod is provided with the customary stationary legs 1 and movable extensible legs 2 and 2a, the latter being mounted in clamps 3 and 4. Each of the stationary legs have a scale thereon, the numbers thereof being spaced a predetermined distance apart as, for example, six inches. In setting up a single tripod on level ground, the clamps 3 and 4 of each set of stationary and movable legs may be set at similar numbers and thereby assist in the leveling-up of the tripod. When a battery composed of a series of tripod units is set up on level ground, all of the extensible legs of each unit is set at the corresponding numbers. If the ground upon which each unit of the battery is set up is of a varying uniform level, one unit of the battery may be set up with one pair of opposing extensible legs 2 and 2a placed at 1, and another pair of opposing extensible legs 2 and 2a placed at 2. The set-up of the remainder of the units of the battery to correspond with the first unit will be facilitated by the scale arrangement and by the use of the level 52.

Stationary legs 1 are mounted in sockets 5, each thereof having inner walls 6. The legs are held in the sockets 5 by means of a rivet or screw 7. The sockets 5 have extending therefrom flanges 8 pivotally mounted on a cross pin or bolt 9, carrying a head 10, and are threaded at 11 to receive a locking nut 12 provided with a handle 13. Adjacent to the head 10 is a stop nut 14 adapted to hold the pin 9 in place when the locking nut 12 is tightened. The inner surface of each flange 8 is serrated to provide projecting teeth 16 functioning as male members, which are adapted to cooperatively engage corresponding depressions or female members 17 on flanges 18 of the tripod supporting base 19. The flanges 8 and 18 cooperatively assembled as set forth, when once set, are locked in place and function to assist in preventing a set-up once made from being unintentionally altered. Each of the circumferential surfaces of the flanges 8 and 18 carry a scale so that when a set-up is made, other units of a battery may be set in a corresponding manner.

The tripod supporting base in the preferred construction is split into arcuate members 20 and 21, each thereof having upper and lower transversely projecting ribs 22 and 23 respectively, provided with surfaces 24 and 25 respectively, arcuate in shape, and adapted for engagement with the outer arcuate face 26 of the lower carrying-head 27. The arcuate members 20 and 21 forming the tripod base 19 have exteriorly projecting flanges 28, 29, 30 and 31. The flanges 28 and 30 are apertured to receive a pin or bolt 32, preferably upset at one end as at 33 and threaded at the other end to receive a locking nut 34. The flanges 29 and 31 are also provided with apertures, the walls thereof carrying a pin or bolt 35 having a head 36 and threaded at 37. The arcuate members 20 and 21 are brought together and tightened by adjusting the locking nut 38, the latter for convenience having a handle 39. When the members 20 and 21 are assembled together, the pin 35 is prevented from turning by the set screw 40.

The lower carrying-head 27 mounted in the arcuate members 20 and 21 for universal movement, has an upper wall 41 provided with a circular recess or groove 42, having side walls 43 and 44, the groove having disposed therein a friction washer 45. While preferably the latter is made of rubber carrying a textile covering impregnated with a moisture-proof agent, for example, paraffin, various other suitable materials may be used, such as leather, wood impregnated with oil, bakelite, and the like. Spaced from the groove 42 is a circular rib 46 having an upper brake surface 47 and a side wall or shoulder 48. Abutting against the shoulder 48 is a ball bearing ring 49 having the balls 50 projecting slightly above the upper surface 47 of the circular rib 46. The balls 50 mounted in the ring 49 ride on the ball bearing supporting member 51.

The upper tripod carrying-head 53 is mounted on the lower carrying-head 27 for horizontal rotative movement and is provided with a standard supporting base member 54 which is recessed on its bottom face to provide a shoulder 55 and an under-cut surface 56. An annular plate 57 disposed adjacent to shoulder 55 rides on the ball bearings 50, thereby reducing friction to a minimum. The standard supporting base 54 is centrally apertured at 58. When the lower and upper carrying-heads are concentrically assembled, the aperture 58 is in alignment with the aperture 59 of the lower carrying-head 27.

A fastening bolt 60, which passes through the respective apertures 58 and 59, is provided with an octagon-shaped head 61 having a portion of one of its apices cut off so that the head 61 will fit closely against the standard supporting member adjacent thereto, thereby preventing the bolt 60 from turning when it is locked in place. The bolt 60 obviously may be made stationary by equivalent mechanical means. The threaded shank 62 of the bolt 61 carries a bearing washer 63, a tension nut 64, and a washer 65, having a male member 66 projecting into a shank groove 67, a locking nut 61' being provided to securely maintain the assembly in locked position. This assemblage of elements provides means for eliminating any vertical motion between the lower carrying-head and the upper carrying-head while permitting smooth, horizontal, rotative motion of the latter on the former.

The standard supporting base 54 is provided with an L-shaped level 52. The standard supporting base 54 has mounted thereon an instrument carrying-head supporting standard 69 and a cooperating second standard 68, the former preferably having strength supporting ribs 70 positioned on the standard supporting base at 71. Such a supporting rib is merely illustrative of a suitable supporting member, it being obvious that the supporting rib may be positioned differently, be of a different construction, and in some cases totally eliminated. Several such supporting ribs may be used when desired. A standard 68 may also, when necessary, be provided with suitable supporting ribs. The instrument supporting standard 69 may also have a central projecting supporting rib 72.

The standards 68 and 69 are provided with apertures 73 and 74, the latter extending through the projecting supporting rib 72 when such a construction is desirable. The walls of the apertures 73 and 74 provide a bearing for a bolt 75 upon which the instrument carrying-head 81 is pivotally mounted. The bolt 75 has a fixed head 75a and a projecting locking pin 76 adapted to be received in a recess 77 of the standard 69, preventing the bolt 75 from turning when the locking nut 79 mounted on the threaded portion 78 of the bolt 75 is tightened.

Mounted for rotative movement and adjacent to the inner wall 80 of the standard 69 is an instrument carrying-head 81 having a projecting instrument seat 82 adapted to carry an instrument 82a. At this point, it is desired to state that the term "instrument" in the present disclosure is used in its broadest significance and includes any material or article adapted to be supported by the instrument seat. The instrument carrying-head 81 has an outer wall 85 and an inner wall 84, the latter having preferably a plane surface. The surface of the outer wall 85 is cut away to provide what is herein termed an upper member 86 having an arcuate wall 83 separating the upper member 86 from the lower wedge-shaped member 87. The lowermost boundary line of the upper member 87 is defined by the compound line ABCDA', as shown in Figure 4. Above this line the horizontal cross-sectional area of the upper member 86 is substantially constant. It is to be noted that the lowermost portion of the outer wall 85 has been cut away in a varying amount to form the lower wedge-shaped member 87, preferably cam-shaped and having a vertically disposed face 88 adjacent to a bottom face 89, preferably curved to simulate a cam surface. The outer wedge surface 88 of the wedge-shaped member 87 is defined by the lines ABCDA' and AEA', and the varying cross-sectional area of the lower member or its wedge shape is clearly shown by an inspection of Figures 1, 4, 5 and 5a. The varying horizontal cross-sectional area of the wedge-shaped member 87 is preferably symmetrical with respect to its center line EC as shown in Figure 4. The stated symmetry of the wedge is apparent from Figures 5 and 5a, the former being a front view looking in the direction of the arrow I, Figure 4, and the latter a rear view looking in the direction of the arrow II.

The inner wall 84 of the article carrying-head 81 is provided with a circular groove 90 having disposed therein a friction packing 91. The friction groove of the packing, instead of being positioned in the instrument carrying-head, may be placed in the inner wall 80 of the standard 69.

Mounted on the bolt 75, and bearing against the outer wall 85 of the instrument carrying-head 81, is a tension spring 92. As shown, this is preferably a flat spring, but it is obvious that any suitable spring, including a coil spring or any mechanical arrangement equivalent to this spring, may be employed, the spring merely being a preferred resilient means. Threadedly mounted on the bolt 75, and adjacent to the spring 92, is a tension nut 93, separated from the locking nut 94 by a washer 95. This assemblage of elements constitutes what may be termed the upper primary braking means. The latter is a variable pressure means in the sense that the braking pressure thereof may be varied by suitable adjustment. However, after being once set the primary braking means engages the instrument carrying head with a constant braking pressure or effect in all positions of the instrument carrying head about its pivot to resist movement of the head on the pivot.

The standard 68 and its projecting standard flange 96 are apertured at 97, the walls thereof being adapted to receive a rotatable externally threaded guide nut 99 having a head 100 and carrying a locking nut 101. The guide nut 99 is recessed to provide a conduit 103, the recess 103 being adapted to receive a cam pin 102 capable of being advanced by the rotation of the guide nut. Mounted upon the cam pin 102 is a tension spring 104 which bears against the shoulder 105, the latter having mounted adjacent thereto a friction gasket 106. This assemblage of elements constitutes the lower variable pressure means.

When adjusting the instrument carrying-head 81, it may be first positioned in place and held there by the pressure of spring 92, the amount thereof being capable of variation by adjusting the position of the tension nut 93 and the locking nut 94. The cam surface 88 is also placed under a predetermined tension, depending upon the weight of the instrument 82a carried by the instrument seat 82, by adjusting the position of the friction gasket 106, this being accomplished by moving the guide nut 99 in and out and thereby varying the tension on the spring 104.

Inasmuch as the thinnest portion of the lower wedge-shaped member 87 is at its vertical axis EC (Figure 4) and opposite the vertical axis of the tension spring 104 and gasket 106, any tendency of the instrument carrying-head 81 and the lower wedge-shaped member to move is resisted. In other words, as the instrument 82a is moved from the horizontal position in either direction, the cross-sectional area of the wedge-shaped member 87 increases and there is a tightening effect.

Thus the spring member 92 and its associated parts constitute a primary braking means having, after initial setting, a constant braking effect on the instrument carrying head, and the gasket 106 and its associated parts constitute a second braking means, the braking effect whereof increases in direct relation to the angular displacement of the head from its normal position.

It is to be noted from the foregoing, that the normal position of the parts is the position in which the instrument support 82 is parallel to the base 54 and consequently is the position in which the center line of the arm of the head 81 is perpendicular to the base 54 so that the brake head 106 is engaged with the lowest part of the brake surface 88. Accordingly, when mention is made of the normal position of these parts in the remainder of this specification and in the claims, the parts are to be understood as in the position above stated.

In order to further assist in locking the article carry-head 81 in any predetermined position, there is provided a brake 108, preferably positioned on the standard 69. A pin 108 having a wing nut 109 is threaded in a bearing 110 fixed to the standard 69. When the pin 108 is tightened it bears against the lower arcuate wall 88 of the wedge-shaped member 87 and so assists in the locking thereof. It is obvious that the brake 108 is merely an auxiliary element and may or may not be employed.

The circumferential surface of the standard 69 is provided with a scale 111 cooperating with a pointer 112 so that when the instrument carrying-head 81 is turned, its angular position may be easily determined. The lower tripod carrying-head 27 has on its outer surface a scale 113 cooperating with a pointer 114 so that the horizontal position of the upper tripod carrying-head 53 may be accurately determined. All the scales herein referred to are marked with a material facilitating the reading of the scales in the dark, as it is contemplated to use the tripod either in the daytime or in the night time. Any suitable radio-active material may be used.

The flanges of the tripod base may be positioned and constructed as shown in Figures 7 and 8. In this form of construction the arcuate base members 20 and 21 have projecting flanges 115 and 116 vertically apertured to receive a body bolt 117, having locking nuts 118 and 119. The flange 115 projects from the upper portion of the outer arcuate face 26 of the arcuate member 20 and the flange 116 extends from the lower portion of the arcuate face 26 of the arcuate member 21, the two arcuate members 20 and 21 when assembled having the flanges in vertical alinement for receiving the bolt 117.

The legs 2 and 2a are each provided with a recess 128 and 129 respectively, adapted to receive oppositely disposed externally threaded members 130 and 131, having heads 132 and 133 fixed to the inner recessed walls 134 and 135 by screws 136 and 137. The member 130 carries left-hand threads, and the member 131, right-hand threads. Rotatively mounted on the threaded members 130 and 131 are bolts 138 and 139, provided with flanges 140 and 141 adapted to bear against the inner clamp walls 142 and 143. It is to be noted that the bolt shanks 144 and 145, extending from the flanges 140 and 141, pass through apertures 146 and 147 of the clamps 3 and 4 and into the tension spacing block recesses 148 and 149, the transverse diameter thereof being slightly larger than the diameter of the bolt shanks 144 and 145, thereby allowing a flexible circumferential play of the spacing block 148a.

The bolt shanks 144 and 145 are provided with apertures 149 and 150 to receive pins 151 and 152 mounted in the spacing block 148a. The diameters of the apertures 149 and 150 are slightly larger than the diameters of the pins 151 and 152, thereby allowing a slight play of the tension spacing block at right angles to the circumferential play. In other words, when the tension block is loose and in a predetermined position, it has a slight vertical play by virtue of the bolt shanks 144 and 145 being smaller than the diameter of the tension block recesses, and a horizontal play to a slight degree due to the relationship between the diameter of the pins 151 and 152 and the diameter of the apertures 149 and 150. The above construction provides compensation for the varying angularity of the tension spacing block 148a.

The structure set forth above provides a locking device for stationary and movable members mounted at a slight angle to one another and adapted to be locked adjacent to one another. The clamps mounted on the movable members and around the stationary members provide movable means which cooperate with means for simultaneously moving the movable members in one direction and the movable means in a reverse direction to tighten and lock the stationary and movable members together. More specifically, the slotted clamps hold each extensible leg to its fixed leg and ride on a pin fixed in each extensible leg. The means for simultaneously moving the movable members in one direction and the movable means in a reverse direction include a tension spacing block, oppositely threaded members fixed in recesses in opposing extensible legs, locking bolts flanged adjacent the inner ends of each clamp and rotatively carried on each threaded member, the latter projecting into grooves in the tension block. The locking bolts are mounted to rotate with the tension spacing block, the latter having a slight horizontal and vertical play to compensate for the varying angularity of the tension spacing block.

The tightening means of the instrument carrying-head may be varied considerably and still come within the spirit of the present invention so long as the tightening means cooperate with the variable pressure means set under a predetermined pressure and effect a tightening action as the instrument carrying head and instrument move from the initial set position. For example, instead of employing an instrument carrying-head having a wedge-shaped lower member producing a cam effect, the wedge may be totally eliminated and a symmetrical cam employed; and the opposing front and rear surfaces thereof, which are eccentric, that is, have varying radii, will function to produce a tightening effect and cooperate with variable pressure braking means. In this case, two lower variable pressure braking means may be positioned adjacent the front and rear cam surfaces. Using such an arrangement, when the instrument carrying-head is pivotally turned, the front lower variable pressure braking means will function when the carrying-head is rotated in one direction, and the rear variable pressure braking means will function when the carrying-head is turned in the reverse direction, it being clear that in either case the front and rear cam surfaces function to produce a tightening effect.

What I claim is:

1. In an instrument mount, means for carrying an instrument carrying head, an instrument carrying head pivotally mounted on said means to swing from an upper to lower position, said instrument carrying head having at least one cam surface, means for setting the cam surface under a predetermined braking pressure to hold the instrument carrying head and the instrument mounted thereon in a predetermined set initial position, said cam surface being shaped to tighten itself against said means as the instrument carrying head and instrument move from the predetermined set initial position.

2. In a support, the combination of a base, a carrying head having a bottom member mounted thereon, variable pressure braking means thereon set under a predetermined pressure to hold an instrument carrying head in a set initial position, means on the bottom member for mounting the instrument carrying head, and an instrument carrying head spaced from the bottom member, and pivotally mounted in said means to swing about a transverse axis, said instrument carrying head having a lower member positioned adjacent said variable pressure braking means and shaped to tighten itself against the latter as the instrument carrying head and the instrument move from the initial set position.

3. In a support, a carrying head having a bottom member, variable pressure braking means mounted thereon set under a predetermined pressure to hold an instrument carrying head in a predetermined set initial position, means on the carrying head for mounting an instrument carrying head, and an instrument carrying head spaced from the bottom member and pivotally mounted in said means to swing about a transverse axis, said instrument carrying head having a cam member positioned adjacent the variable pressure braking means, the cam member being shaped to tighten itself against the variable pressure braking means as the instrument carrying head and the instrument move from the initial set position, the more the cam member moves the greater the tightening action.

4. In a support, a carrying head having a bottom member, variable pressure braking means mounted thereon and set under a predetermined pressure to hold an instrument carrying head in a predetermined set initial position, means on the bottom member for mounting an instrument carrying head, an instrument carrying head spaced from the bottom member and pivotally mounted in said means to swing about a transverse axis and having a lower portion in the shape of a cam wedge positioned adjacent the variable pressure braking means, the cam wedge tightening itself against the variable pressure braking means as the instrument carrying head and instrument move from the initial set position.

5. In a support, a base, a carrying head mounted thereon having a bottom member, variable pressure braking means mounted thereon and set under a predetermined pressure to hold an instrument carrying head in a set initial position, means on the bottom member for mounting an instrument carrying head, an instrument carrying head spaced from the bottom member and pivotally mounted in said means to swing about a transverse axis, said instrument carrying head having a lower portion in the shape of a wedge positioned adjacent the set variable pressure braking means, the wedge shaped member tightening itself against said variable pressure braking means as the instrument carrying head and instrument move from the initial set position.

6. In a support, the combination of a base, a carrying head mounted thereon having a bottom member, an instrument carrying head pivotally mounted on said base to swing about an axis transverse of the carrying head from an upper to a lower position, said instrument carrying head having an upper member and a lower wedge shaped member, upper primary braking means positioned adjacent the upper member and lower variable pressure braking means positioned against the wedge shaped member and set under a predetermined pressure to hold the carrying head and the instrument in a predetermined set initial position, said lower wedge shaped member tightening itself against the lower variable pressure braking means as the instrument carrying head and the instrument move from the initial set position.

7. In an instrument mount, a supporting base, a lower carrying head mounted in said base for universal movement, an upper carrying head having a base member mounted for horizontal relative movement on said lower carrying head, means on said base member for carrying an instrument carrying head, an instrument carrying head pivotally mounted in said means to swing about a transverse axis and having an upper member and a lower member, upper primary braking means positioned against the upper member, and lower variable pressure braking means positioned adjacent the lower member and set under predetermined pressure to hold the instrument carrying head and the instrument in a predetermined set initial position, said lower member tightening itself against the lower variable pressure braking means as the instrument carrying head and instrument move from the initial set position.

8. In an instrument mount, a supporting base, a lower carrying head mounted in said base for universal movement and having an upper wall provided with a recess and a braking surface, friction material disposed in said recess, an upper carrying head having a base mounted for horizontal rotating movement on the lower carrying head, a portion of the lower surface of said base being disposed adjacent said friction material, means carried by said base and cooperating with said breaking surface to lock the upper carrying head in a predetermined position on the lower carrying head, means on the base of the upper carrying head for mounting an instrument carrying head, an instrument carrying head pivotally mounted in said means to swing about an axis transverse thereof and having a lower tightening member, variable pressure braking means positioned against the tightening member and set under a predetermined pressure to hold the instrument carrying head in a predetermined set initial position, said lower member tightening itself against the variable pressure braking means as the instrument carrying head and instrument move from the initial set position.

9. In an instrument mount, a supporting base, a lower carrying head mounted in said base for universal movement, an upper carrying head having a base member mounted for horizontal rotative movement on said lower carrying head, an instrument carrying head supporting standard mounted on the base member and apertured to receive transverse thereof an instrument carrying head bearing, a second standard mounted on the base member adapted to journal the instrument carrying head bearing, an instrument carrying head pivotally mounted on the transverse bearing to swing from an upper to a lower position and having an upper member and a lower wedge shaped member, upper primary braking means mounted on the instrument carrying head, a resilient braking member mounted on a pin carried in the second supporting standard adjacent the lower wedge shaped member of the instrument carrying head, said resilient braking member being set under a predetermined pressure to hold the instrument carrying head and the instrument in a predetermined set initial position, the lower wedge shaped member tightening itself against the resilient braking member as the instrument carrying head and instrument move from the initial set position.

10. In an instrument mount, a supporting base, a lower carrying head mounted in the base for universal movement, an upper carrying head mounted for horizontal rotative movement on said lower carrying head and having a base member, an instrument carrying head supporting standard mounted on the base member and apertured to receive transverse thereof an instrument carrying head bearing, a second standard adapted to journal the instrument head bearing and having positioned therein a rotatable externally threaded guide nut recessed along its longitudinal axis and adapted to receive a pin capable of being advanced by rotation of the guide nut, an instrument carrying head pivotally mounted on the transverse bearing to swing from an upper to a lower position and having an upper member and a lower wedge shaped member, upper primary braking means mounted on the instrument carrying head bearing adjacent the upper member of the instrument, and a resilient braking member mounted on the guide nut pin adjacent the lower wedge shaped member of the instrument carrying head and set under a predetermined pressure to hold the instrument carrying head and instrument in a predetermined set initial position, said lower wedge shaped member tightening itself against the resilient braking member as the instrument carrying head and instrument move from the initial set position.

11. In an instrument mount, a supporting base, a lower carrying head including a bottom member mounted for horizontal rotative movement on said lower carrying head, means for eliminating vertical motion between the lower carrying head and the upper carrying head while permitting smooth horizontal motion of the latter on the former, means on the bottom member of the upper carrying head for mounting an instrument carrying head, an instrument carrying head spaced from the bottom member and pivotally mounted in said means to swing about a transverse axis and having an upper member and a lower tightening member, upper primary braking means positioned against the upper member, and lower variable pressure braking means positioned adjacent the lower tightening member and set under a predetermined pressure to hold the instrument carrying head and instrument in a predetermined set initial position, said lower carrying member tightening itself against the lower variable pressure braking means as the instrument carrying head and instrument move from the initial set position.

12. In an instrument mount, a supporting base, a lower carrying head mounted in said base for universal movement, an upper carrying head having a bottom member mounted for horizontal rotative movement on said lower carrying head, means for eliminating vertical motion between the lower carrying head and the upper carrying head while permitting horizontal rotative motion of the latter on the former, means on the bottom member of the upper carrying head for mounting an instrument carrying head, an instrument carrying head spaced from the bottom member and pivotally mounted on said means to swing about an axis transverse thereof from an upper to a lower position, and having an upper member and a lower wedge shaped member, upper primary braking means positioned adjacent the upper member of the instrument carrying head, and lower variable pressure braking means positioned adjacent the lower wedge shaped member and set under predetermined pressure to hold the carrying head and the instrument in a predetermined set initial position, said lower wedge shaped member tightening itself against the lower variable pressure braking means as the carrying head and the instrument move from the initial set position.

13. In an instrument mount, a ball member, a base for supporting the same comprising split arcuate members, interiorly projecting flanges on the base having arcuate surfaces adapted to engage the outer surface of the ball member, means for tightening the split arcuate members and the projecting interior flanges against the outer surface of the ball member, a carrying head having a bottom member mounted on the ball member, variable pressure braking means on the bottom member set under a predetermined pressure to hold an instrument carrying head in a set initial position, means on the bottom member for mounting an instrument carrying head, and an instrument carrying head spaced from the bottom member and pivotally mounted in said means to swing about a horizontal transverse axis from an upper to a lower position, said instrument carrying head having a lower member positioned against said variable pressure braking means and shaped to tighten itself against the latter as the instrument carrying head and the instrument move from the initial set position.

14. In an instrument mount, a ball member, a base for supporting said ball member, an instrument carried by the ball member, said instrument being adapted to produce vibrations tending to move the ball member relative to the base member, interiorly projecting spaced ribs on the base member having arcuate surfaces engaging the outer arcuate surface of the ball member, and means for applying a locking pressure substantially equally to each rib to lock the ribs of the base member against the outer arcuate surface of the ball member to thereby substantially prevent movement of the ball member relative to the base member.

15. In an instrument mount, a ball member, a base for supporting said ball member, an instrument carried by the ball member, said instrument being adapted to produce vibrations tending to move the ball member relative to the base member, interiorly projecting ribs on the base member spaced above and below the horizontal axis thereof, said ribs having arcuate surfaces engaging the outer arcuate surface of the ball member, means for applying a locking pressure in a lateral direction substantially equally to each rib to lock the ribs of the base member against the arcuate surface of the ball member to thereby substantially prevent movement of the ball member relative to the base member.

16. In an instrument mount, a ball member, a base comprising split arcuate members for supporting said ball member, an instrument carried by the ball member, said instrument being adapted to produce vibrations tending to move the ball member relative to the base member, interiorly projecting ribs on the base member, spaced above and below the horizontal axis thereof, said ribs having arcuate surfaces engaging the outer arcuate surface of the ball member, means for applying a locking pressure in a lateral direction substantially equally to each rib to lock the ribs of the base member against the arcuate surface of the ball member to thereby substantially prevent movement of the ball member relative to the base member.

17. In an instrument mount, a support, an instrument carrying head pivotally mounted on said support and having a normal position from which it may move on said pivot, and brake means for said head and resisting movement of the head from normal position with a resistance which increases in effect as the position of the head increases in distance from its normal position, said brake means including a pair of frictionally engaged members movable one past the other, and one of said members having its engaging surface inclined to wedge against the other member as the head moves from normal position.

18. In an instrument mount, a support, an instrument carrying head pivotally mounted on said support and having a normal position from which it may move on said pivot, and brake means for said head and resisting movement of the head from normal position with a resistance which increases in effect as the position of the head increases in distance from its normal position, the increase in braking effect being in predetermined ratio with the extent of angular displacement of said head from its normal position, said brake means including a pair of frictionally engaged members movable one past the other, and one of said members having its engaging surface inclined to wedge against the other member as the head moves from normal position.

19. In an instrument mount, a support, an instrument carrying head pivotally mounted on said support and having a normal position from which it may move on said pivot, brake means for said head and resisting movement of the head from normal position with a resistance which increases in effect as the position of the head increases from its normal position, and means for adjusting the initial pressure of the brake means against the said head, said brake means including a pair of frictionally engaged members movable one past the other, and one of said members having its engaging surface inclined to wedge against the other member as the head moves from normal position.

20. In an instrument mount, a support, an instrument carrying head pivotally mounted on said support and having a normal position from which it may move on said pivot, primary brake means for said head with constant braking effect in all positions of the head about its pivot to resist movement of the head on the pivot, and secondary brake means engaging said head and resisting movement of the head from normal position with a resistance which increases in effect as the position of the head increases in distance from its normal position, said brake means including a pair of frictionally engaged members movable one past the other, and one of said members having its engaging surface inclined to wedge against the other member as the head moves from normal position.

21. In an instrument mount, a support, an instrument carrying head pivotally mounted on said support and having a normal position from which it may move on said pivot, primary brake means for said head with constant braking effect in all positions of the head about its pivot to resist movement of the head on the pivot, secondary brake means engaging said head and resisting movement of the head from normal position with a resistance which increases in effect as the position of the head increases in distance from its normal position, the increase in braking effect of said secondary braking means being in predetermined ratio with the extent of angular displacement of the head from its normal position, said brake means including a pair of frictionally engaged members movable one past the other, and one of said members having its engaging surface inclined to wedge against the other member as the head moves from normal position.

22. In an instrument mount, a support, an instrument carrying head pivotally mounted on said support and having a normal position from which it may move on said pivot, primary brake means for said head with constant braking effect in all positions of the head about its pivot to resist movement of the head on the pivot, secondary brake means engaging said head and resisting movement of the head from normal position with a resistance which increases in effect as the position of the head increases in distance from its normal position, and independent means for adjusting the respective initial pressures of the primary and secondary brake means on said head, said brake means including a pair of frictionally engaged members movable one past the other, and one of said members having its engaging surface inclined to wedge against the other member as the head moves from normal position.

23. In an instrument mount, a support, an instrument carrying head provided with a lower wedge-shaped portion, said instrument carrying head being pivotally mounted on said support and having a normal position from which it may move on said pivot, brake means engaging said wedge-shaped portion and resisting movement of the instrument carrying head from its normal position, the braking effect of said brake means on said head increasing in predetermined ratio with the displacement of the head from its normal position.

24. In an instrument mount, a support, an instrument carrying head pivotally mounted on said support and having a normal position from which it may move on said pivot, and primary and secondary brake means engaging said head, the braking effect of the secondary brake means on said head increasing in direct ratio with the displacement of the head from its normal position, said secondary brake means including a pair of rotatively movable frictionally engaged members one of which moves with the head, one of said members constituting a wedging means for the other member.

GREENHOW JOHNSTON.